M. A. KENDALL.
PULLEY.
APPLICATION FILED NOV. 28, 1917.
1,286,343.
Patented Dec. 3, 1918.
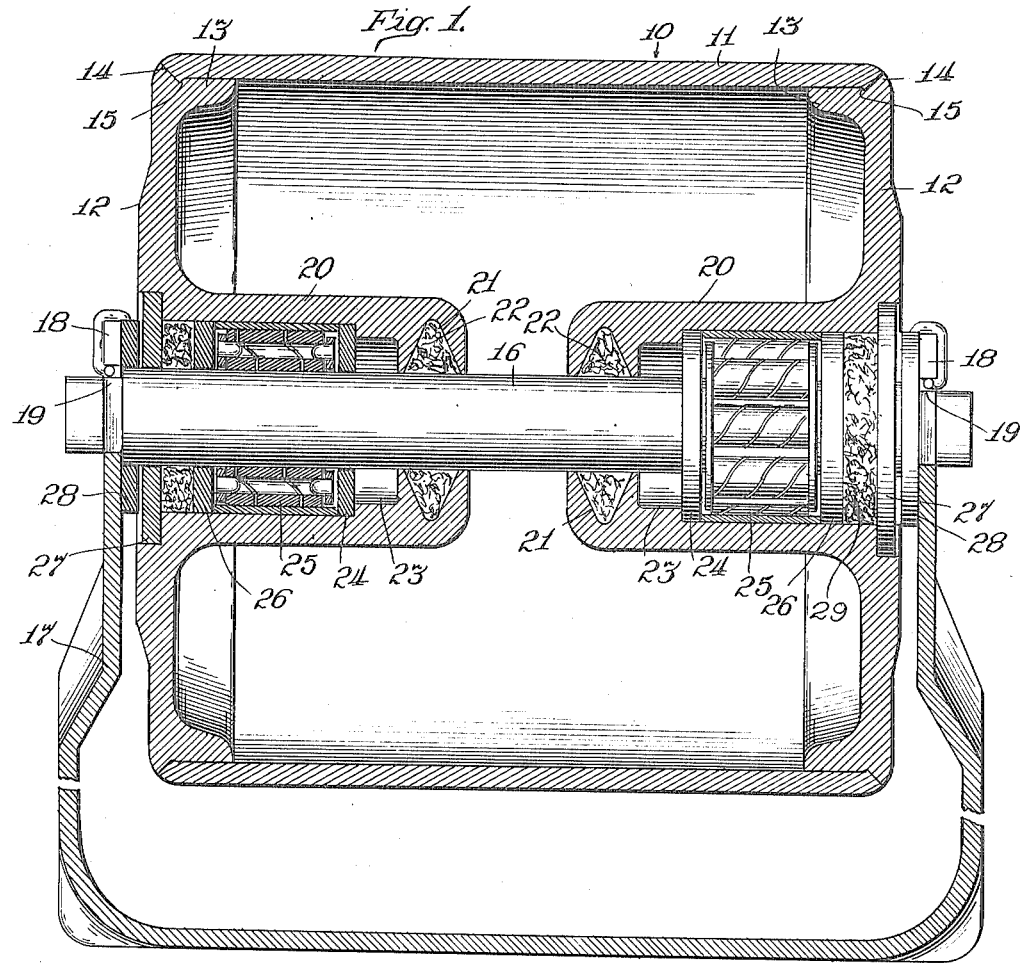
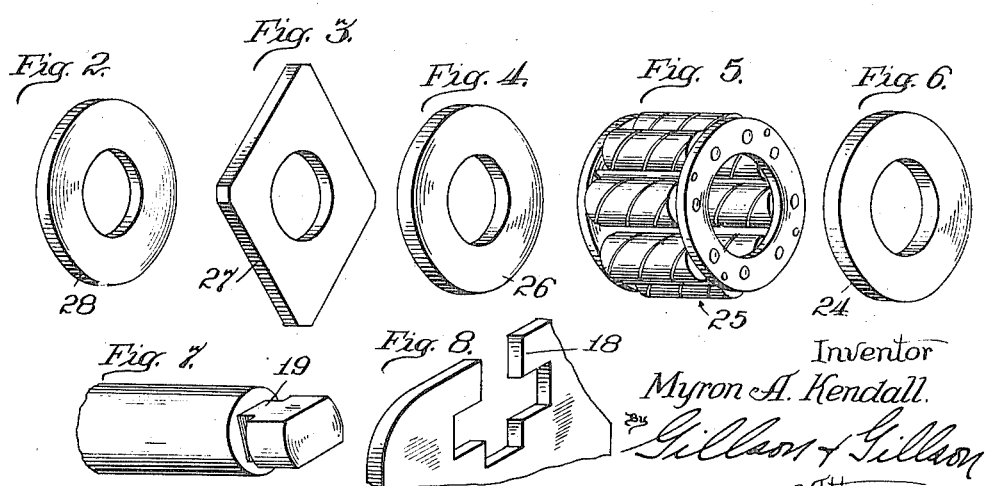
Inventor
Myron A. Kendall.
By Gillson & Gillson
Attorneys.

UNITED STATES PATENT OFFICE.

MYRON A. KENDALL, OF AURORA, ILLINOIS, ASSIGNOR TO STEPHENS-ADAMSON MANUFACTURING COMPANY, OF AURORA, ILLINOIS, A CORPORATION OF ILLINOIS.

PULLEY.

1,286,343.      Specification of Letters Patent.      Patented Dec. 3, 1918.

Application filed November 28, 1917. Serial No. 204,404.

*To all whom it may concern:*

Be it known that I, MYRON A. KENDALL, a citizen of the United States, and resident of Aurora, county of Kane, and State of Illinois, have invented certain new and useful Improvements in Pulleys, of which the following is a specification, and which are illustrated in the accompanying drawings, forming a part thereof.

The invention relates to pulleys and more particularly to those intended for use as supports for conveyer belts. Inasmuch as these pulleys are usually of relatively small diameter they are frequently required to rotate at a very considerable speed while supporting a substantial load, particularly when the conveyer belt is employed for rapidly transporting heavy material. Furthermore a free running pulley is essential to prevent undue wear upon the belt. It also frequently occurs that the pulleys are so located as to render attention to them for lubrication or repair quite inconvenient. One of the principal objects of the invention is therefore to provide a construction which will operate efficiently under a heavy load, for long periods, without attention.

One embodiment of the invention is illustrated in the accompanying drawings, in which:—

Figure 1 is a vertical axial section through a pulley constructed in accordance with the present invention, Figs. 2 to 6 inclusive are perspective views of the various parts comprised in one of the bearings of the pulley, Fig. 7 is a detail perspective view showing one end of the pulley axle, and Fig. 8 is a detail perspective view of the upper part of one of the holders or supports for the pulley.

The pulley 10 comprises a cylindrical rim 11 mounted on end plates 12. The end plates 12 are preferably formed with instanding peripheral flanges 13 which support the interior face of the rim 11. Longitudinal displacement of the rim 11 relatively to the end plates 12 is prevented by a ridge 14 on each end plate which engages the outer edge of the rim 11 and also by a groove 15 between the ridge 14 and the flange 13. In assembling the pulley the flange 13 of each end plate is fitted within the rim 11 at one end and then the edge of the latter is swaged to enter the groove 15 and make close contact with the ridge 14.

It will be seen that with this construction the rim is of uniform thickness throughout whereby the rim may wear away almost wholly before the pulley collapses or becomes unserviceable. Further, by means of the swaged connection shown a rounded corner is produced without any recesses or grooves for collecting dirt or projections which might cause undue wear upon the conveyer belt.

The pulley 10 is mounted on a non-rotatable axle 16 supported at each end by the upstanding portions or a holder 17. This holder 17 may be attached to any convenient support (not shown) so that the construction shown forms a complete unit by itself. In the upper portions of the holder 17 are formed slots 18 in the form of a cross, the lowest arm of which is adapted to receive the slotted end of the axle 19. As the slot 18 and the end 19 of the axle 16 are of rectangular form, the axle 16 is prevented from rotating although the intermediate portion of the axle is round.

The end plates 12 are provided with inwardly extending tubular hubs forming deep outwardly facing sockets 20 within which are arranged roller bearings 25 and also devices for preventing dust and dirt entering the bearing and simultaneously restricting the escape of lubricant from the bearing.

At the bottom of each socket 20 is formed an annular groove 21 and within this groove is arranged a ring 22 of felt or other fibrous material. An annular recess 23 located at one side of the felt ring 22 serves as a reservoir for the lubricant. Next beyond the space 23 is a metal washer 24. The roller bearing 25 is located between the washer 24 and a similar washer 26, also fitting within the socket 20, but near the outer end of the same.

In order to prevent grit and dirt entering the bearing from the outside an annular felt ring 29 is pressed against the washer 26 by means of a rectangular plate 27. Rotation of the plate 27 with the pulley is preferably insured, as by fitting the plate in a correspondingly shaped recess in the outer face of the end plate 12. If desired a loose washer 28 may be applied to the shaft 16 between each plate 27 and the adjacent upright portion of the holder 17.

Roller bearings, as 25, are particularly serviceable when the pulley is required to support a substantial load. The construction insures an efficient operation of the bearings for long periods, without attention, and dust or gritty substances likely to cause injury to bearings of this type are effectually excluded.

I claim as my invention:

1. In a pulley, in combination, a rim, a pair of end plates of smaller diameter than the rim, means for pivotally supporting the end plates, said rim being connected to each of said end plates by a swaged non-projecting connection and said rim being of uniform thickness throughout whereby the rim may wear away almost wholly before the pulley becomes unserviceable.

2. In a pulley, in combination, a rim, a pair of end plates, means for pivotally supporting the end plates, each of said end plates having an instanding flange formed thereon adapted to support the rim said rim and end plates have swaged connections therebetween adapted to prevent relative longitudinal movement of the rim and end plates and said rim being of uniform thickness throughout whereby the rim may wear away almost wholly before the pulley becomes unserviceable.

3. In a pulley, in combination, a rim, a pair of end plates, means for pivotally supporting the end plates, each of said end plates having at its outer edge an inwardly directed flange, an outwardly directed ridge, and a groove therebetween, said flange contacting with the inner face of the rim and said ridge contacting with the edge of the rim, the edge of said rim being swaged into engagement with said ridge and said groove.

4. In a pulley, in combination, a rim and a pair of centrally apertured end plates, each end plate being inwardly depressed about the aperture forming a central relatively deep outwardly facing socket with the inner wall of each socket formed with an outwardly facing annular shoulder intermediate its ends, a stationary spindle extending through the apertures and sockets of both end plates, anti-friction bearing members turning between the spindle and the wall of the socket of each end plate in front of the corresponding annular shoulder but not extending to the mouth of the socket, a packing filling the socket of each end plate over the corresponding bearing members, and a packing surrounding the spindle at the inner end of the socket of each end plate, the space between the inner end of the socket of each end plate and the corresponding annular shoulder constituting a lubricant reservoir.

MYRON A. KENDALL.